United States Patent
Chin et al.

(10) Patent No.: US 8,009,638 B2
(45) Date of Patent: Aug. 30, 2011

(54) METHOD FOR REDUCED ACCESS DELAY IN MULTIPLE ACCESS ATTEMPT EXCHANGES

(75) Inventors: Tom Chin, San Diego, CA (US); John Randall Pilkington, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 859 days.

(21) Appl. No.: 11/870,228

(22) Filed: Oct. 10, 2007

(65) Prior Publication Data

US 2008/0025283 A1    Jan. 31, 2008

Related U.S. Application Data

(63) Continuation of application No. 10/782,595, filed on Feb. 18, 2004, now Pat. No. 7,298,723.

(51) Int. Cl.
   *H04B 7/216* (2006.01)
(52) U.S. Cl. .......................... 370/335; 455/574; 370/350
(58) Field of Classification Search .................. None
   See application file for complete search history.

(56) References Cited

U.S. PATENT DOCUMENTS

| | | | |
|---|---|---|---|
| 6,937,641 B2 | 8/2005 | Li et al. | |
| 7,058,400 B2 | 6/2006 | Brooks | |
| 7,149,555 B2 | 12/2006 | Suda | |
| 7,298,723 B2 * | 11/2007 | Chin et al. | 370/335 |
| 2002/0065117 A1 * | 5/2002 | Suda | 455/574 |
| 2003/0026324 A1 * | 2/2003 | Li et al. | 375/141 |

FOREIGN PATENT DOCUMENTS

WO    9712476    4/1997

OTHER PUBLICATIONS

International Search Report—PCT/US2005/004486, International Search Authority—European Patent Office—May 13, 2005.
Written Opinion—PCT/US2005/004486, International Search Authority—European Patent Office—May 13, 2005.
International Preliminary Report on Patentability—PCT/US2005/004486, International Search Authority—IPEA/US—Alexandria, Virginia—Sep. 1, 2006.

* cited by examiner

Primary Examiner — Erika A Gary
(74) Attorney, Agent, or Firm — Peng Zhu; Sayed H. Beladi

(57) ABSTRACT

A system and method for reducing access delay associated with multiple access attempt exchanges in a communications network is provided. A system of the present invention may include a mobile station and a base station system for sending and receiving signals; an air interface link for carrying the signals; and a set of timing modules for governing the transmission of the signals, whereby the set of timing modules controls activation periods of the battery's current flow to the transmit clock according to a predetermined time interval. Control of activation periods minimizes delay during access attempts and conserves power resources.

26 Claims, 3 Drawing Sheets

METHOD FOR REDUCED ACCESS DELAY IN MULTIPLE ACCESS ATTEMPT EXCHANGES

CROSS-REFERENCE TO RELATED APPLICATION

This application is a continuation of U.S. patent application Ser. No. 10/782,595, filed on Feb. 18, 2004, now U.S. Pat. No. 7,298,723, which is herein incorporated by reference in its entirety.

BACKGROUND

The present invention generally relates to wireless communication networks and, more particularly, to a system and method to reduce access delay associated with multiple access attempt exchanges between devices associated with such a network. Generally, wireless communications supply users with numerous services via a variety of devices, including mobile telephones, pagers, and handheld devices, gaming devices and servers. Such services may include voice, paging, video, and messaging; i.e., sending and receiving text messages via mobile devices such as mobile telephones. Advanced messaging features may include group paging, pre-programmed messages, on-call groups, scheduled messages, and repeating messages. Integrated services provide two or more services via the same device. For example, one such integrated service, push-to-talk (PTT), delivers audio messaging services in real-time, combining the flexibility of messaging with the ease-of-use of voice. PTT permits users to connect directly, in seconds, to another PTT user by pushing a button on a mobile telephone (not unlike the communication exchange between "walkie-talkies"). PTT services often include group-calling, in which icons appear directly on the user's handset, indicating which users are available to participate. This eliminates the need for the user to waste valuable time attempting to identify which of the contacts are available. Group calling further provides the advantage of providing voice services between many users at the same time, as opposed to one-on-one conversations.

The Code Division Multiple Access (CDMA) system is widely employed in many of the aforementioned services. It allows numerous signals to occupy a common frequency band, optimizing the use of available bandwidth. CDMA employs analog-to-digital conversion (ADC) in combination with spread spectrum technology. ADC facilitates the conversion of audio input from the sending device to binary elements. The binary elements are then transmitted to the receiving device. The stream of binary elements from one mobile sending device is distinguished from the binary elements of another mobile sending device by means of Pseudonoise (PN) sequences. There are trillions of possible codes generated from the Pseudonoise sequence, thus minimizing interference.

The varied code pattern employed in CDMA applications is calculated according to a specific, complex algorithm that is a function of time. To receive signals transmitted according to this scheme, the sending device and receiving device must "know" both the code generating function and its current position in the sequence. Therefore the sending device and the receiving device must initially synchronize respective time clocks to ensure simultaneous starting time points. Synchronization of the respective time clocks typically includes turning on the transmit clock at the correct frequency and loading the correct state into the long code generator and I-channel and Q-channel PN sequence generators at the correct time to ensure that codes output by the long code generator and the I-channel and Q-channel PN sequence generators have the proper sequence at the proper time; i.e., synchronized to CDMA system time. References to "PN generators," as used herein, refer to both the long code generator and the I-channel and Q-channel PN sequence generators, which are clocked by the transmit clock. According to the CDMA IS2000 standard, the CDMA long code generator is the CDMA system time PN sequence generator. This long code is used to channelize the mobile to decrease interference and eliminate cross-talk. If the sending device and receiving device have their long codes aligned differently in time, then communication will fail. The I-channel and Q-channel PN sequence is used for the transmit time reference.

As a precursor to many CDMA applications, an initial access process consisting of several asynchronous access attempt messages, or multiple access attempt exchange (MAAE), may be executed between the sending device and an initial receiving device, such as a base station system, or equipment designed to initially receive signals transmitted from the sending device. For example, in PTT applications, once the user invokes the PTT service by pushing a button on the mobile telephone, the MAAE commences. An MAAE of the prior art typically entails drawing current from a battery of the sending device to provide power to a transmit clock associated with the sending device; synchronizing the transmit clock, with its associated long code and I-channel and Q-channel PN codes, with a CDMA time source associated with the communication network; attempting to access the receiving device via the communication network to establish a link; i.e., sending a series of coded signals or probes; then removing current flow from the battery to the transmit clock (which results in stoppage of the transmit clock) to conserve energy and prolong the life of the battery. The foregoing steps are iteratively repeated in rapid succession, as more than one access attempt is generally required during a single MAAE before successful establishment of a link occurs. A classic example of an MAAE occurs each time a user presses the button of a mobile telephone to initiate a push-to-talk session.

Users of mobile communication services, such as PTT, expect a seamless, near-instantaneous communication connection between their device, such as a mobile telephone, and another device, such as the mobile telephone of another user. Despite such expectations, mobile communication services of the prior art typically incur significant delays, particularly during the initial connect phase, or the MAAE. Such delays are compounded by the time lost each time the battery current is reapplied to the transmit clock and the sending device must synchronize its transmit clock and associated PN generators with the CDMA time source.

One alternative to reduce transitional delay during MAAE is to permit the battery current flow to the transmit clock to remain activated for the entire time the sending device is powered on whether or not an MAAE is in progress, thus eliminating the need for subsequent synchronization processes after the initial time synchronization. This alternative quickly expends power resources and adversely impacts battery life.

It is apparent from the foregoing that a need exists for an improved system and method for minimizing delay during the MAAE phase in wireless communication applications. There is a further need to provide such a system and method that conserves energy resources and prolongs battery life.

SUMMARY

An aspect includes steps of determining if a transmit clock is stopped; if the transmit clock is stopped, activating a current flow from a power device to the transmit clock, powering the transmit clock via the power device, and starting the transmit clock and synchronizing the transmit clock and associated PN generators; sending one or more access probes from the sending device to the receiving device via the link; and deactivating the current flow from the power device to the transmit clock after lapse of a predetermined time interval measured by a control device.

Another aspect includes steps of (a) activating current flow from the battery to the transmit clock; (b) starting the transmit clock and synchronizing the transmit clock and associated PN generators with a system time associated with the communication network via the air interface link; (c) sending a series of access probes from the mobile station to the base station system via the air interface link; (d) setting a timer for a predetermined time interval; if a successive access is to be attempted, (e) determining if the timer has expired; if the timer has expired, repeating preceding steps starting from step (a); and if the timer has not expired, stopping the timer; and repeating the preceding steps starting from step (c).

Still another aspect includes a sending device, the sending device transmitting signals to the receiving device via the link. The sending device includes a power device, the power device providing a power source; a transmit clock, the transmit clock receiving the power source; and a control device, the control device controlling activation periods of the current flow from the power device to the transmit clock and controlling periods in which the sending device transmits signals according to a predetermined time interval.

Yet another aspect includes a mobile station having a battery, the mobile station sending and receiving signals to and from the base station system via the air interface link. The mobile station includes a battery, the battery providing a power source; a transmit clock, the transmit clock receiving the power source; and a timer, the timer controlling activation periods of the power device to the transmit clock and controlling periods in which the sending device transmits signals according to a predetermined time interval, such as a range of one to five seconds.

A further aspect includes a sending device, the sending device transmitting signals to the receiving device via the link, the sending device having a transmit clock, the transmit clock receiving the power source; and a set of timing modules, the set of timing modules governing periods for transmission of the signals and controlling activation periods of the current flow from the battery to the transmit clock according to a predetermined time interval.

A still further aspect includes means for activating a battery's current flow to the transmit clock; means for starting a transmit clock and synchronizing the transmit clock and associated PN generators with a system time associated with a communication network via an air interface link; means for sending a series of access probes from the mobile station to the base station system via the air interface link; means for setting a timer for a predetermined time interval; means for deactivating the current flow from the battery to the transmit clock and stopping the transmit clock after expiration of the timer; means for determining if a successive access is to be attempted; means for determining if the predetermined time interval has expired; and means for stopping the timer if the timer has not expired.

Yet a further aspect includes steps of: a step for sending and receiving signals between a mobile station having a battery and a base station system via an air interface link; and a step for governing the transmission of the signals by controlling activation periods of the battery's current flow to the transmit clock according to a predetermined time interval.

Still another aspect includes a set of timing modules, the set of timing modules governing transmission of signals by controlling activation of a battery's current flow to the transmit clock according to a predetermined time interval.

A further aspect includes a control device for governing an optimal time interval that limits the activation of the power device and permits transmission of signals from the sending device to the receiving device via the link.

These and other features, aspects and advantages of the present invention will become better understood with reference to the following drawings, description and claims.

DETAILED DESCRIPTION OF THE INVENTION

Figure 1:
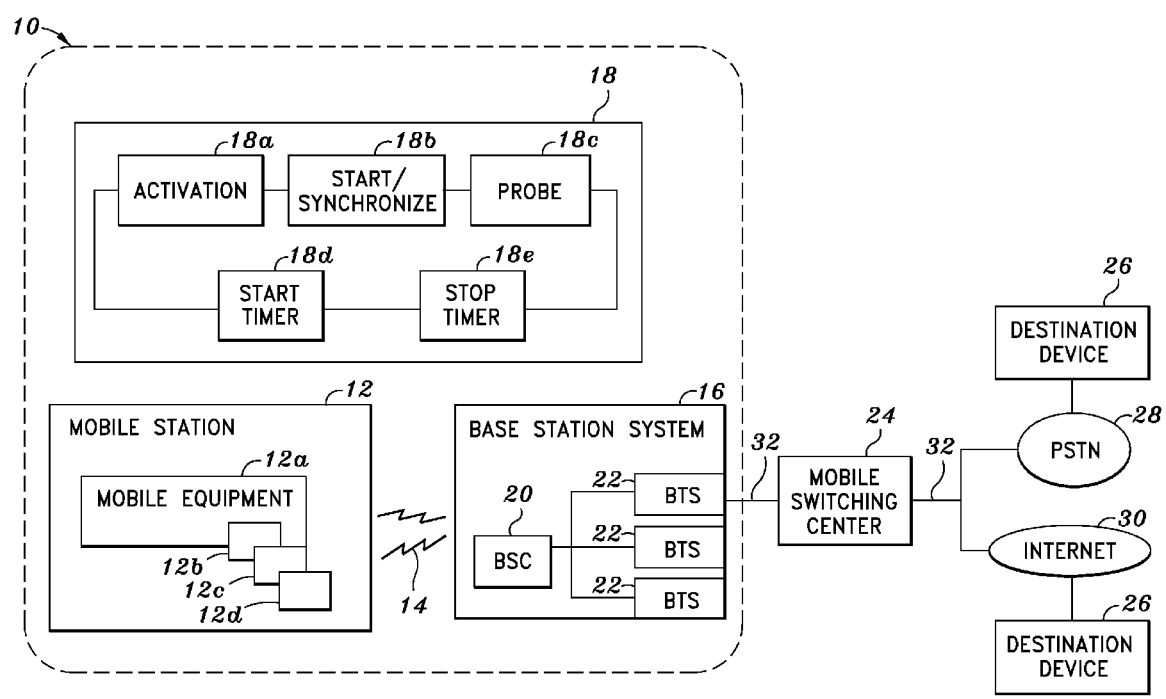
FIG. 1 is a system schematic for multiple access attempt exchanges in a wireless communication network, according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a system and method for optimizing a multiple access attempt exchange (MAAE) in a wireless communication network. More specifically, and in contrast to the prior art, various embodiments of the present invention may minimize the delay normally incurred during multiple synchronization operations in a single MAAE. In contrast to the prior art, various embodiments may conserve power resources associated with various devices. The MAAE is a process executed between a sending device such as a mobile station or mobile telephone and a receiving device such as a base station system via a link such as an air interface link. During MAAE, a mobile station's power source to the transmit clock, such as a battery, can be activated and the timing of the mobile station's transmit clock and associated PN generators can be synchronized to a CDMA system time through an alignment of the transmit clock timing to the timing received from the base station. Once synchronization is accomplished, a set of access probes (signals) may be sent from the mobile station to the base station system. After transmission of an initial set of probes, a control device, such as a timer associated with the mobile station, can be used to control one or more periods during the multiple access attempt exchange by, for example, performing a predetermined action. For example, the timer can be set for a predetermined time interval. The predetermined time interval may be an optimal time interval as determined by selecting a maximum time period for sending signals without resynchronization of the transmit clock and associated PN generators (thus minimizing delay), wherein the maximum time period may be limited by a determination of the maximum time period in which the power device may be permitted activation to the transmit clock (thus conserving power resources). Once the timer is set, the transmit clock may remain started and the transmit clock and associated PN generators may remain synchronized, thus successive access attempts may be made during such a period without incurring the delay associated with re-starting the transmit clock and re-synchronizing the transmit clock and associated PN generators with CDMA system time. The control device, such as the timer, can also control one or more periods in which the battery's current flow to the transmit clock is deactivated, thus conserving power resources. Deactivation of the battery's current flow to the transmit clock can result in inactivation or stoppage of the transmit clock. For example, in various embodiments the timer may be set according to a predetermined time interval. In this example, expiration of the timer may result in deactivation of current flow from the battery to the transmit clock, which may stop the transmit clock. Before each set of successive probes is sent, the timer can be checked. If the timer has not expired, then a successive set of probes may be sent. The timer may be reset. If, however, the timer has expired (resulting in deactivation of the battery's current flow to the transmit clock and stoppage of the transmit clock), then the battery's current flow to the transmit clock can be reactivated and the transmit clock can be restarted and the transmit clock and associated PN generators can be re-synchronized prior to transmission of the successive set of probes. Limiting redundant synchronization processes coupled with limiting periods of battery current flow to the transmit clock can result in an optimized MAAE process. In contrast to processes of the prior art, embodiments of the present invention can reduce the communication exchange delays experienced by users of mobile devices without significant depletion of power reserves of the mobile devices. As a skilled artisan will note, embodiments of the present invention are applicable to various wireless communication services, including push-to-talk, gaming, data calling, and video messaging.

Turning now to the drawings, wherein like items are referenced with the same numerals, FIG. 1 generally shows an exemplary system 10 for multiple access attempt exchanges that may have a mobile station (MS) 12 sending and receiving signals via an air interface link 14 to and from a base station system (BSS) 16, and a set of timing modules 18 governing transmissions between the MS 12 and the BSS 16, as shown encompassed in the phantom oval. The MS 12, such as a mobile telephone or other device, may include mobile equipment (ME) 12a. The ME 12a can typically comprise hardware elements such as a battery 12b, a transmit clock with associated PN generators; i.e., long code generator and I-channel and Q-channel PN sequence generators 12c, a timer 12d, a screen, processor, circuit boards, transmitter, and receiver.

The BSS 16 may include a Base Station Controller (BSC) 20 and one or more Base Transceiver Stations (BTS) 22. The BSS 16 may provide the functionality that enables the MS 12 to access various network services over the air interface link 14, such as by signal transmission. The signal information may then be converted to various communication formats and may be forwarded to destination media. For example, the signal may be transmitted to a mobile switching center (MSC) 24, for onward transmission of the associated information to one or more destination devices 26 via, for example, a publicly switched telephone network (PSTN) 28, the Internet 30, a communication link 32, or a combination thereof.

The communication link 32 may comprise and utilize any medium, method, or a combination thereof for communication transfer, including short wave radio, analog lines, digital networks, and so forth. The set of timing modules 18 may include an activation module 18a, a start and synchronization module 18b, a probe module 18c, a start timer module 18d, and a stop timer module 18e. The set of timing modules 18 may include any combination of modules necessary to carry out the function described herein. Furthermore, the modules may be embodied as hardware, software, or a combination thereof. The modules 18 may be integral components of the MS 12, the BSS 16, or both. Furthermore, the modules 18 may be remotely embodied elsewhere and accessible to the MS 12, to the BSS 16, or to both.

In various applications such as push-to-talk (PTT), the MS 12 initially may attempt to contact the BSS 16 by transmission of a series of signals. In an MAAE, as heretofore described, the activation module 18a may activate the current flow from the battery 12b to the transmit clock 12c, which provides an energy source for the transmit clock 12c. After activation, the start and synchronization module 18b may start the transmit clock 12c and synchronize the transmit clock and associated PN generators 12c with CDMA system time by matching the frequency of the transmit clock and the states of the long code generator and I-channel and Q-channel PN sequence generators to the timing received from the BSS 16. The probe module 18c may direct the MS 12 to send access probes (not shown) via the air interface link 14 to the BSS 16, and the initial access attempt completes. After transmission of an initial set of access probes, the current flow from the battery 12b to the transmit clock 12c may remain activated and the start timer module 18d may set the timer 12d for a predetermined time interval. Upon expiration of the set time, the current flow from the battery 12b to the transmit clock 12c may be deactivated, thus eliminating the power source to the transmit clock 12c and stopping it. The predetermined time interval may include a range of one to five seconds, a two-second period, or other time limitations. The predetermined time interval of an embodiment of the present invention may vary according to specific application and objectives. For example, a gaming device may utilize an embodiment of the present invention having one precise time interval, and a mobile telephone offering PTT services may utilize a second precise time interval. Discrete time intervals exemplified herein are for illustrative purposes only.

If subsequent access attempts are to be made and the predetermined timer interval on the timer 12d has not yet expired, then the stop timer module 18e may stop the timer 12d, and repeat the procedure starting with the transmission of probes; i.e., the probe module 18c may then direct the MS 12 to send a series of probes via the air interface link 14 to the BSS 16.

If subsequent access attempts are to be made and the predetermined timer interval on the timer 12d has expired, then the access attempts may be accomplished according to the procedure set out above for an initial access attempt; i.e., the activation module 18a may again activate the current flow from the battery 12b to the transmit clock 12c, and so forth.

If no further access attempts are to be made, then the MAAE may complete. Significantly, the subsequent access attempts during an MAAE in an embodiment do not require the start and synchronization process, thus do not incur the considerable delay inherent in prior art processes that synchronize the transmit clock and associated PN generators 12c after each access attempt in a single MAAE. Furthermore, deactivation of the current flow from the battery 12b to the transmit clock 12c after expiration of the predetermined time interval conserves energy and prolongs battery life.

Figure 2:
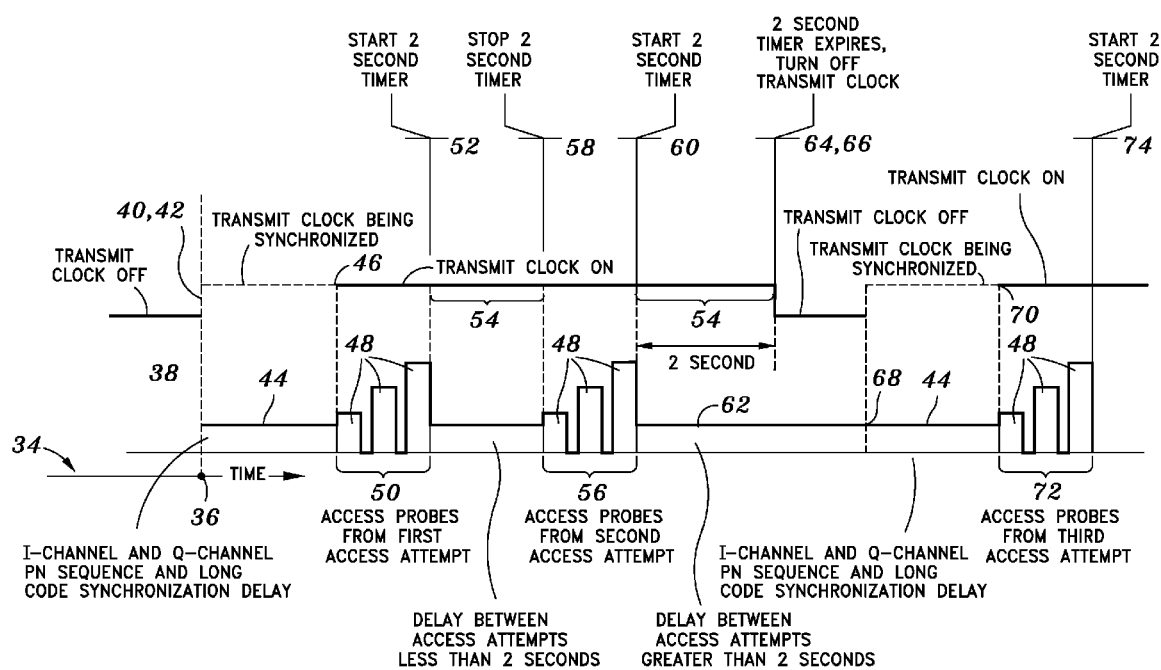
FIG. 2 is a timeline diagram of a multiple access attempt exchange according to an embodiment of the present invention.

With reference now to FIG. 2, there is shown a timeline diagram of a multiple access attempt exchange according to an embodiment of the present invention. A timeline 34 starting at 36 identifies periods of time during which the transmit clock is off, periods of time in which the transmit clock is on and the transmit clock and associated PN generators are synchronizing, and periods of time in which the transmit clock is on and the transmit clock and associated PN generators are synchronized. After an arbitrary point in time 38 on the timeline 34, and while the transmit clock is turned off, the battery's current flow to the transmit clock may be activated at 40 and may provide power to the transmit clock at 42, after which a sequence of long codes and I-channel and Q-channel PN sequences may be aligned to CDMA system time at 44.

Upon completion of the synchronization step 44, the transmit clock is on and the transmit clock and PN generators are synchronized with CDMA system time at 46. Access probes 48 may be sent during a first access attempt at 50, immediately after which the timer may be started at 52 and set for a predetermined time interval, depicted in this example as a two-second interval 54 (or a portion thereof). Access probes may be sent during a successive access attempt within the two-second interval 54 (or a portion thereof). For example, access probes 48 from a second access attempt are sent at 56, and the timer is stopped at 58. Immediately following a transmission of access probes, the timer may be reset for a two-second interval, as shown at 60. If the delay between access attempts exceeds two seconds, as shown at 62, the timer may continue to run down, expiring at the two-second setpoint, as shown at 64. Upon expiration of the two-second period at 64, the current flow from the battery to the transmit clock may be deactivated, thus stopping the transmit clock at 66. Further access attempts may require activation of the battery's current flow to the transmit clock, as shown at point 68, whereafter the synchronization step 44 may be performed. After synchronization, the transmit clock and associated PN generators are accurate with CDMA system time at 70, access probes 48 may be sent at 72, after which the timer may be started at time 74, and the MAAE may continue as described until MAAE is completed.

Figure 3:
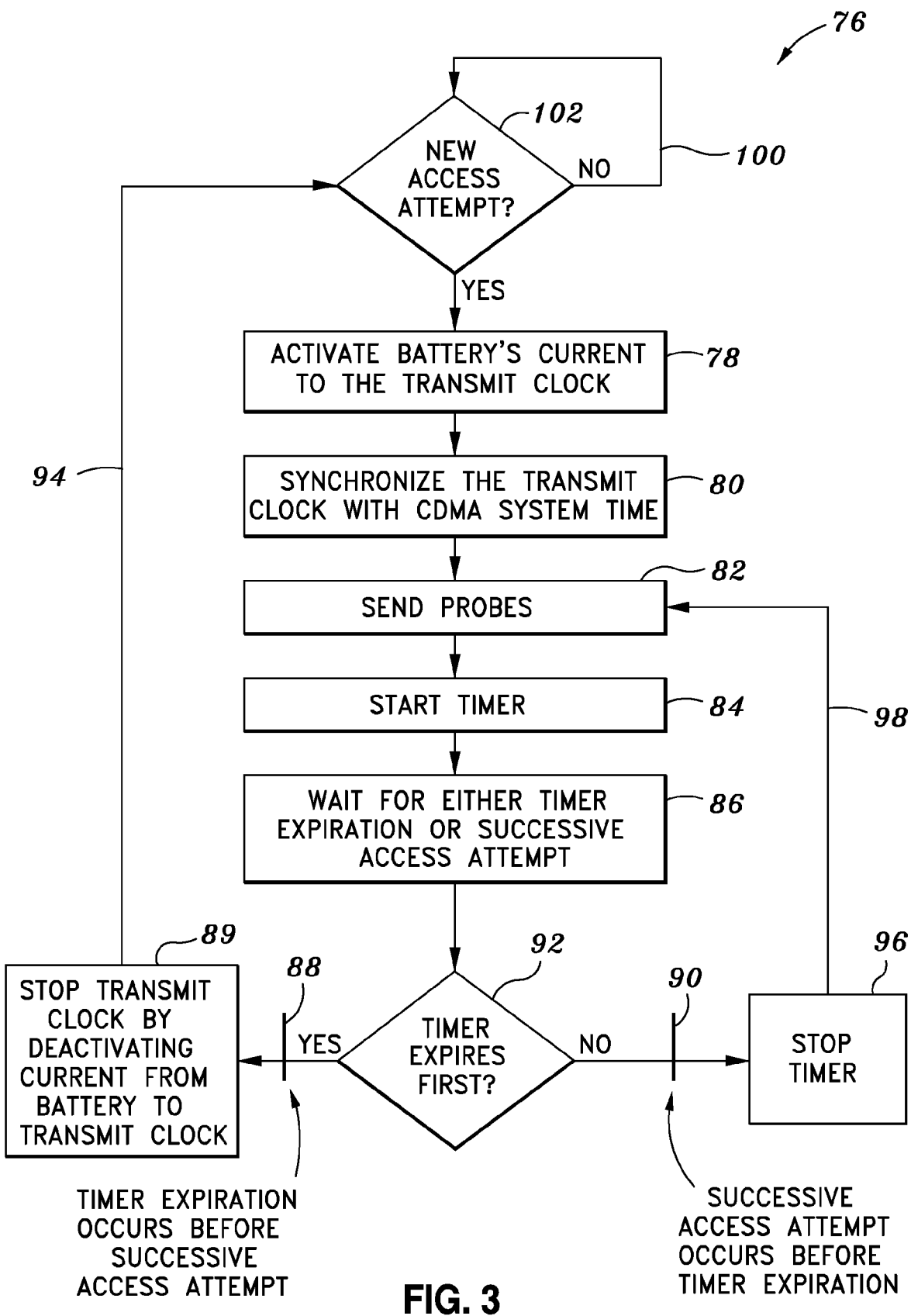
FIG. 3 is a flow diagram of a method according to an embodiment of the present invention.

Turning now to FIG. 3 (and with continuing reference to FIG. 1), there is shown generally at 76 a flow diagram of a method for reducing delay during a multiple access attempt exchange in a communications network, including activating the current flow from the battery 12b to the transmit clock 12c at step 78; for example, activating the battery's 12b current to the transmit clock 12c and long code generator and I-channel and Q-channel PN sequence generators. At step 80, the transmit clock 12c and associated PN generators may be synchronized with CDMA system time associated with the communication network 10; for example, synchronizing the transmit clock 12c and long code and I-channel and Q-channel PN sequence generators (not shown) with CDMA system time. Once the transmit clock 12c is accurate with CDMA system time, the MS 12 may send a series of probes to the BSS 16 via the air interface link 14, as shown in step 82. Upon completion of step 82, the timer may be set to the predetermined time interval at step 84. Continuation of the current MAAE may be checked and determined at 86. For example, the program may wait for either timer expiration or a successive access attempt, after which various logic paths may be taken, shown, for example, at 88 and 90.

If one or more successive access attempts are to be performed, then the state of the transmit clock may be checked to ensure that the transmit clock is started and the transmit clock and associated PN generators are synchronized prior to transmission of the access probes of the successive access attempt. If the transmit clock has been stopped and a successive attempt is to be performed, then the battery's current flow to the transmit clock may need to be reactivated to power the transmit clock, and the transmit clock may need to be restarted and the transmit clock and associated PN generators may need to be re-synchronized. For example, expiration of the timer 12d may trigger deactivation of the current flow from the battery 12b to the transmit clock 12c and stoppage of the transmit clock 12c, thus ensuring that the expenditure of power resources is limited. A step may be taken to determine if the transmit clock is started. For example, in various embodiments, this step may include checking the state of the battery's current flow to the transmit clock or state of the transmit clock, or checking the status of the timer 12d, as shown at branch 98. Because the expiration of the timer may result in deactivation of the battery's current flow to the transmit clock and stoppage of the transmit clock, once the status of the timer is determined an inference may be drawn regarding the states of the battery and transmit clock. For example, if the timer is checked, and it is determined that the timer had expired at branch 88, then it may be inferred that the battery's current flow to the transmit clock had been deactivated and the transmit clock stopped, as shown at 89. In such circumstances, successive access attempts may commence by iteratively repeating steps of the multiple access attempt exchange starting with the step 78 for activating the current flow from the battery 12b to the transmit clock 12c, as shown at branch 94. If the timer 12d is checked, and it is determined that the timer had not expired at 90, it may then be inferred that the battery's current flow to the transmit clock remains activated, the transmit clock remains started and the transmit clock and associated PN generators remain synchronized. In such circumstances, the timer 12d had been stopped at 96. Successive access attempts may commence at branch 98 by iteratively repeating steps of the multiple access attempt exchange starting with the step 82 of sending the probes.

It should be understood, of course, that the foregoing relates to preferred embodiments of the invention and that modifications may be made without departing from the spirit and scope of the invention as set forth in the following claims.

We claim:

1. A method of reducing delay during a multiple access attempt exchange of a sending device having a power device, a transmit clock, and a control device, the method comprising:
    determining if the transmit clock is stopped;
    if the transmit clock is stopped, activating the power device, powering the transmit clock via the power device, starting the transmit clock, and synchronizing the transmit clock and associated pseudonoise (PN) generators with system time;
    sending one or more access probes from the sending device to a receiving device; and
    deactivating the power device after lapse of a predetermined time interval measured by the control device.

2. The method of claim 1, further comprising, prior to deactivating the power device and prior to the lapse of the predetermined time interval, sending at least a second access probe from the sending device to the receiving device without re-synchronizing the transmit clock.

3. The method of claim 1, wherein the sending device further comprises a mobile telephone.

4. The method of claim 1, wherein the receiving device further comprises a base station system.

5. The method of claim 1, wherein the control device further comprises a timer.

6. The method of claim 1, wherein the one or more access probes is sent via an air interface link.

7. A method of reducing delay during a multiple access attempt exchange in a communication network having a base station system and a mobile station with a battery, a transmit clock, and a timer, the method comprising
    activating a current from the battery to the transmit clock;

starting the transmit clock and synchronizing the transmit clock and associated pseudonoise (PN) generators with system time associated with the communication network;

sending a series of access probes from the mobile station to the base station system;

setting a timer for a predetermined time interval;

if a successive access is to be attempted, determining if the timer has expired;

if the timer has expired, reactivating the current from the battery to the transmit clock; and if the timer has not expired, sending a second series of access probes from the mobile station to the base station system.

8. The method of claim 7, wherein the predetermined time interval is selected from a range of one second to five seconds.

9. The method of claim 8, wherein the range further comprises two seconds to four seconds.

10. The method of claim 9, wherein the predetermined time interval is two seconds.

11. A mobile station with a sending device having a power device, the mobile station comprising:

a control device operable to activate and to deactivate a transmit clock associated with the power device, wherein the control device is operable to start a timer based on a predetermined time interval, and wherein the control device is operable to stop the timer in response to a successful access attempt by the sending device.

12. The mobile station of claim 11, wherein the sending device transmits at least one access attempt probe during the predetermined time interval.

13. The mobile station of claim 11, further comprising a receiving device to receive signals from the sending device.

14. The mobile station of claim 11, wherein the series of access probes is sent via an air interface link.

15. The mobile station of claim 11, wherein the mobile station further comprises a mobile telephone.

16. The mobile station of claim 11, wherein the mobile station further includes a transmit clock.

17. The mobile station of claim 11, wherein the predetermined time interval ranges from one second to five seconds.

18. A system to reduce delay during a multiple access attempt exchange by a mobile station having a battery, a transmit clock, and a timer, the system comprising:

means for activating a current from the battery to the transmit clock;

means for starting the transmit clock and synchronizing the transmit clock and associated pseudonoise (PN) generators with a system time associated with a communication network associated with the mobile station;

means for sending a series of access probes from the mobile station to a base station system;

means for setting a timer for a predetermined time interval; and means for deactivating the current from the battery to the transmit clock and for stopping the transmit clock in response to expiration of the timer.

19. The system of claim 18, wherein the means for setting a timer further comprises means for setting a timer according to a predetermined time interval in the range of one to five seconds.

20. The system of claim 18, wherein the means for setting a timer further comprises means for setting a timer for a time period of two seconds.

21. The system of claim 18, wherein the communications network further comprises a wireless communication network.

22. The system of claim 21, wherein the wireless communications network further comprises a code division multiple access (CDMA) wireless communications network.

23. A tangible computer readable medium including instructions operable, when executed by a computer, to cause the computer to:

power a transmit clock;

synchronize the transmit clock with a code division multiple access (CDMA) system clock;

initiate an access attempt to a receiver by sending a plurality of access probes to the receiver and starting a timer associated with a time interval; and after expiration of the timer and before receiving acknowledgement of a successful access attempt from the receiver, stop the timer and deactivate the transmit clock.

24. The tangible computer readable medium of claim 23, wherein the instructions are further operable, when executed by the computer, to cause the computer to:

receive from the receiver an acknowledgement of a successful access attempt;

in response to receiving the acknowledgement of the successful access attempt, send a second plurality of access probes and restart the timer associated with the time interval.

25. The tangible computer readable medium of claim 24, wherein continuing to power the transmit clock enables the computer to send a second plurality of access probes without re-activating the transmit clock.

26. The tangible computer readable medium of claim 25, wherein the time interval is a time period during which re-synchronization of the transmit clock is not necessary and during which the transmit clock may remain powered.

* * * * *